US 011679811 B2

United States Patent
Hirai et al.

(10) Patent No.: US 11,679,811 B2
(45) Date of Patent: Jun. 20, 2023

(54) FRONT VEHICLE-BODY STRUCTURE FOR VEHICLE

(71) Applicant: MAZDA MOTOR CORPORATION, Hiroshima (JP)

(72) Inventors: Shunsuke Hirai, Aki-gun (JP); Hiroaki Ishizu, Aki-gun (JP); Hidekazu Shiraishi, Aki-gun (JP); Kyohei Hirata, Aki-gun (JP); Kazuki Yamauchi, Aki-gun (JP); Takumi Fukuda, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 181 days.

(21) Appl. No.: 17/191,381

(22) Filed: Mar. 3, 2021

(65) Prior Publication Data
US 2021/0309302 A1 Oct. 7, 2021

(51) Int. Cl.
*B62D 25/08* (2006.01)
*B60J 1/02* (2006.01)

(52) U.S. Cl.
CPC .............. *B62D 25/081* (2013.01); *B60J 1/02* (2013.01); *B62D 25/088* (2013.01)

(58) Field of Classification Search
CPC .. B62D 25/081; B62D 25/082; B62D 25/088; B60J 1/02
See application file for complete search history.

(56) References Cited

U.S. PATENT DOCUMENTS

2010/0320712 A1* 12/2010 Leanza ................ B62D 25/082
280/124.134

FOREIGN PATENT DOCUMENTS

| EP | 2033879 A1 * | 3/2009 | ........... B62D 25/081 |
| EP | 3613654 A1 * | 2/2020 | ............. B62D 21/02 |
| EP | 3613655 A1 * | 2/2020 | ............. B62D 21/11 |
| EP | 3613657 A1 * | 2/2020 | ............. B62D 21/11 |
| JP | 2010-247743 A | 11/2010 | |

* cited by examiner

*Primary Examiner* — Lori L Lyjak
(74) *Attorney, Agent, or Firm* — Studebaker & Brackett PC (57) ABSTRACT

A front vehicle-body structure for reducing second-order vibration of a windshield, and improving NVH performance in a vehicle cabin. A tower bar coupling each of left and right front suspension housings with a region around a vehicle-width-direction center portion of a cowl forming a lower edge of an opening for a front windshield has a center portion extending in a vehicle width direction along the cowl. A bracket extending from the cowl toward a front of a vehicle is provided in a region including a vehicle-width-direction center portion of the front windshield in the lower edge of the opening. The center portion of the tower bar is fixed to the bracket from above, and a reinforcement member supporting the fixing region from below is provided.

19 Claims, 9 Drawing Sheets

FRONT VEHICLE-BODY STRUCTURE FOR VEHICLE

BACKGROUND

Technical Field

This disclosure relates to a front vehicle-body structure for a vehicle, the front vehicle-body structure including, for example, a front windshield fixed to an edge portion of an opening formed in a vehicle body, a pair of left and right front suspension housings, a cowl forming a lower edge of the opening for the front windshield, and a tower bar coupling each of the left and right front suspension housings with a vehicle-width-direction center portion of the cowl.

Background Art

As a front vehicle-body structure for a vehicle, a structure has been known which includes a so-called tower bar coupling upper portions of left and right suspension towers together or coupling the suspension towers with a cowl for an improvement in traveling performance of the vehicle.

As an example of the latter, Japanese Patent Laid-Open No. 2010-247743 mentioned below discloses a vehicle-body front structure in which a center portion of a tower bar in a vehicle width direction is mounted on a center portion of a cowl (dashboard upper portion) in the vehicle width direction.

In addition, Japanese Patent Laid-Open No. 2010-247743 discloses a configuration which includes a box-shaped reinforcement member in the center portion of the cowl in the vehicle width direction in order to enhance rigidity of a portion around a mounting portion of the tower bar on this cowl.

Incidentally, the present inventors have found that in traveling of a vehicle, left and right regions of a windshield, the regions dividing the windshield into two parts at a vehicle-width-direction center portion, vibrate in opposite phases due to vibration (110 to 120 Hz) from a road surface (hereinafter, such vibration will also be referred to as "second-order vibration").

In addition, the present inventors have been working on reduction in the above-described second-order vibration of the windshield due to vibration from a road surface in traveling of the vehicle, specifically, reduction in a difference between amplitudes having different phases of two antinodes produced by a second-order vibration mode in order to improve NVH (noise, vibration, and harshness) performance in a vehicle cabin.

In such a circumstance, the present inventors have focused on the fact that enhancement of rigidity of a region in a cowl supporting a lower edge of the windshield, the region corresponding to a portion around the center portion of the windshield, is effective for reduction in second-order vibration of the windshield.

However, for example, in a case where the cowl is caused to have a closed cross-section structure as in Japanese Patent Laid-Open No. 2010-247743, because the tower bar may not directly be mounted on the cowl, devising is necessary for reduction in second-order vibration of the windshield.

Above-described Japanese Patent Laid-Open No. 2010-247743 employs a configuration in which the center portion of the tower bar in the vehicle width direction is mounted on a bracket extending from the cowl toward a front of the vehicle in a cantilever shape but does not mention a conception of a further improvement in rigidity of this mounting portion for reducing second-order vibration of the windshield or a specific structure. Thus, there is room for improvement.

SUMMARY

The present disclosure has been made in consideration of the above, and aims to provide a front vehicle-body structure for a vehicle that can reduce second-order vibration of a windshield and improve NVH performance in a vehicle cabin (for example, causing an occupant to be less likely to sense muffled sound).

This disclosure provides a front vehicle-body structure including a front windshield fixed to an edge portion of an opening formed in a vehicle body; a pair of left and right front suspension housings; a cowl forming a lower edge of the opening for the front windshield; and a tower bar coupling each of the left and right front suspension housings with a region around a vehicle-width-direction center portion of the cowl. The pair of left and right tower bars have a center portion extending in a vehicle width direction along the cowl, a bracket extending from the cowl toward a front of a vehicle is provided in a region including a vehicle-width-direction center portion of the front windshield in the lower edge of the opening, the center portion of the tower bar is fixed to the bracket from above, and a reinforcement member supporting the fixing region from below is provided.

In the above configuration, as for second-order vibration of the front windshield due to vibration transmitted from a road surface to the front windshield in vehicle traveling, the bracket extending forward from the cowl is fixed by the tower bar from above and is supported by the reinforcement member from below, and vibration in an up-down direction, the vibration being a cause of second vibration of the windshield in the cowl, can thereby be inhibited from both of an upper side and a lower side of the bracket provided to the cowl.

Accordingly, NVH performance in a vehicle cabin can be improved.

As an aspect of this disclosure, the tower bar is mounted on the reinforcement member in two parts separated in the vehicle width direction in the center portion, and a portion of the tower bar between mounting portions in the two parts is formed so as to have higher bending rigidity than the mounting portions.

In the above configuration, deformation of the tower bar, the deformation occurring between tower bar mounting portions mounted on the vehicle body and vibrating the tower bar in opposite phases, is further inhibited, and second-order vibration of the front windshield can be reduced.

As an aspect of this disclosure, a ridge is formed along the vehicle width direction in a region of the bracket in front of the cowl.

In the above configuration, because bending rigidity of the bracket in a direction orthogonal to the vehicle width direction is enhanced by the ridge, vibration having a node in a vehicle-width-direction center portion and having opposite phases on left and right sides can be made less likely to occur, and second-order vibration of the front windshield can be reduced.

As an aspect of this disclosure, a mounting position of the reinforcement member on the bracket and a position of the ridge are formed to be offset in a vehicle front-rear direction.

In the above configuration, vibration having a node in the vehicle-width-direction center portion of the front windshield and having opposite phases in left and right regions can be made less likely to occur, and second-order vibration of the front windshield can further be reduced.

As an aspect of this disclosure, the mounting position of the reinforcement member on the bracket agrees with the fixing region of the bracket in a vehicle planar view.

In the above configuration, because the reinforcement member can be mounted on the position corresponding to the fixing region of the bracket, the fixing region can further be reinforced.

As an aspect of this disclosure, below the reinforcement member, a closed cross-sectional member is provided which extends in a vehicle down direction from the reinforcement member.

In the above configuration, because the reinforcement member itself is reinforced by the closed cross-sectional member, the fixing region, to which the center portion of the tower bar is fixed, in the bracket can further be reinforced.

The above configuration can reduce second-order vibration of a front windshield and improve NVH performance in a vehicle cabin.

DETAILED DESCRIPTION

An embodiment of the present disclosure will hereinafter be described based on drawings.

Figure 1:
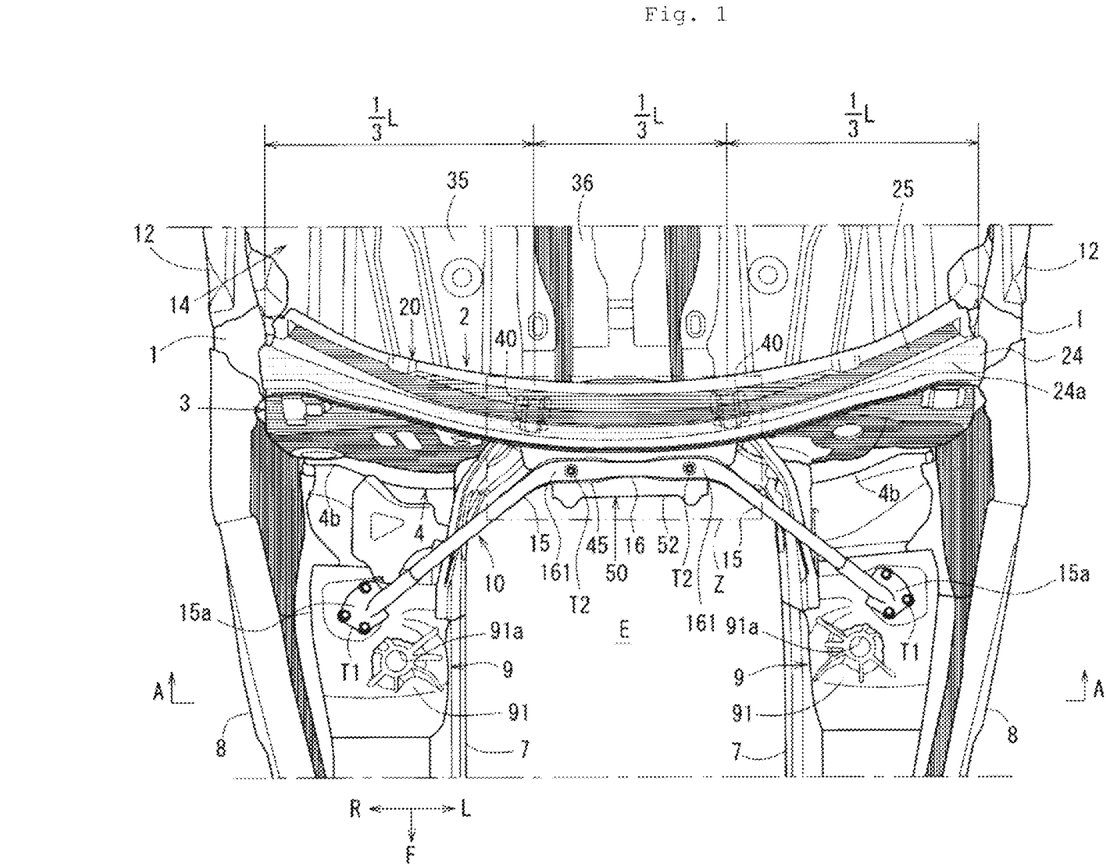
FIG. 1 is a plan view illustrating principal components of a front vehicle-body structure for a vehicle of this embodiment.
Figure 2:
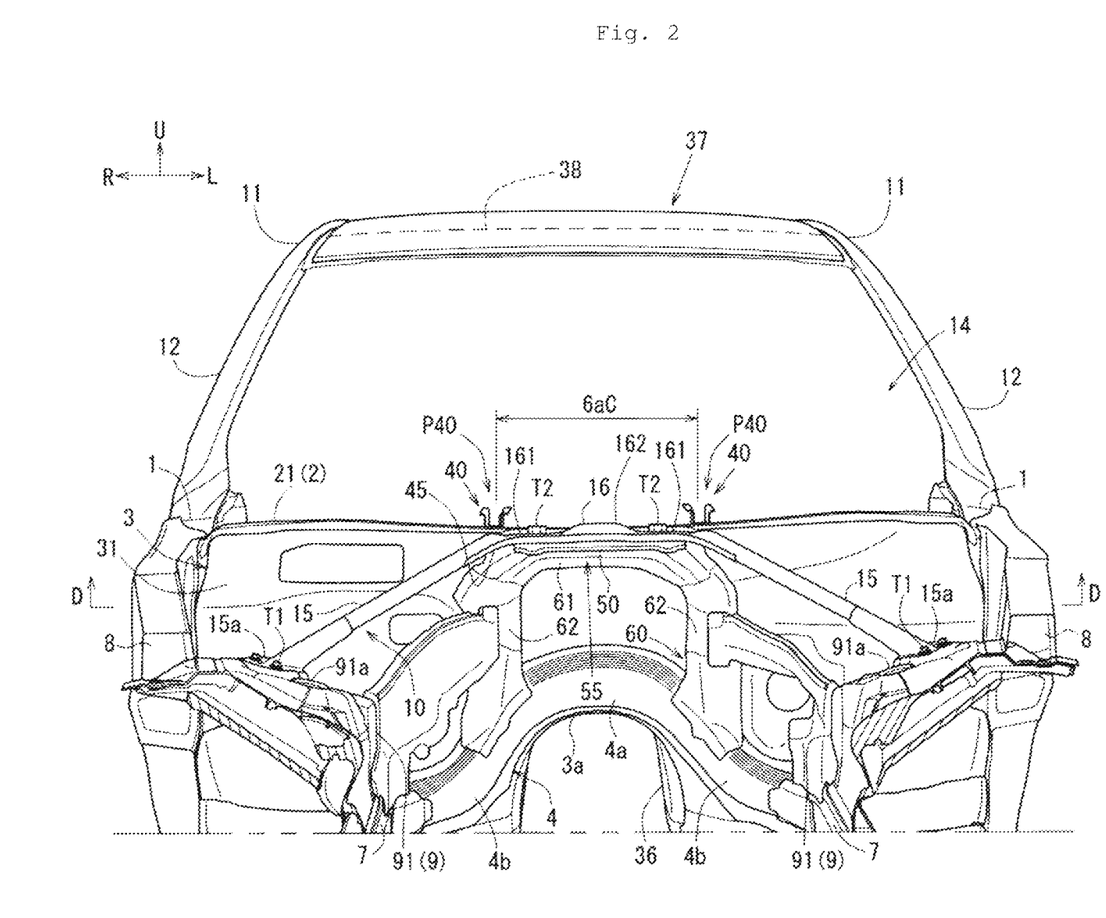
FIG. 2 is an arrow cross-sectional view taken along A-A in FIG. 1.
Figure 3:
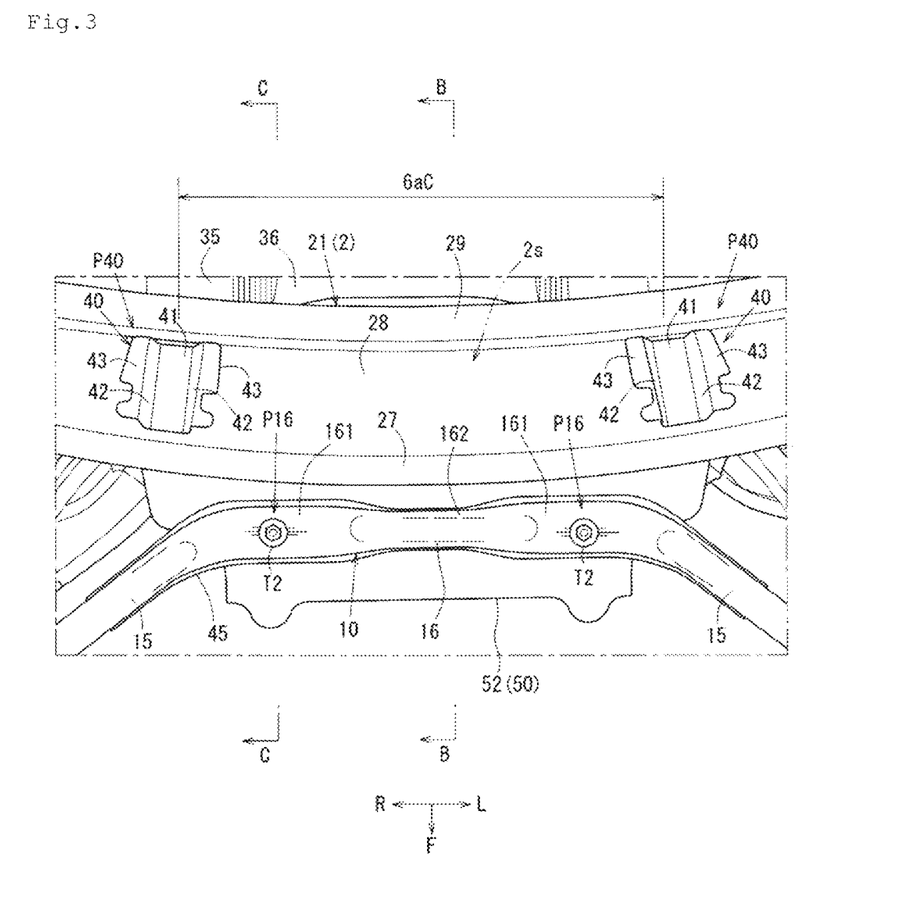
FIG. 3 is an enlarged view of a region Z of FIG. 1, the enlarged view being illustrated by removing a cowl panel upper portion.

In the drawings, an arrow F indicates a vehicle front area, an arrow U indicates a vehicle upper area, an arrow R indicates a vehicle right area, and an arrow L indicates a vehicle left area. In FIG. 1 and FIG. 2, a bonnet 5 and a front windshield 6 are not illustrated, and FIG. 2 and FIG. 3 illustrate a state where a cowl upper panel 20 is removed.

As illustrated in FIG. 1 and FIG. 2, a front vehicle-body structure for a vehicle of this embodiment includes left and right hinge pillars 1, a cowl 2, a dash panel 3, a dash cross member 4, the bonnet 5 (see FIG. 5), the front windshield 6 (see FIG. 5), left and right front side frames 7 (see FIG. 1), left and right apron reinforcements 8 (hereinafter abbreviated as "apron-rein 8"), left and right front suspension towers 9 (hereinafter abbreviated as "sus-tower 9"), and a tower bar 10.

The left and right hinge pillars 1 are provided at an interval corresponding to a generally whole width of a vehicle body and each extend in a vehicle up-down direction. Note that front pillars 12 are provided which extend to a rear and upper area of the vehicle and from upper ends of the hinge pillars 1 to roof side rails 11.

The cowl (also referred to as "cowl box") 2 extends in the vehicle width direction between upper end portions of the left and right hinge pillars 1 and is formed into, in a planar view, a general arc shape (arch shape) having a general center in the vehicle width direction protruding to the vehicle front area (see FIG. 1).

Figure 5:
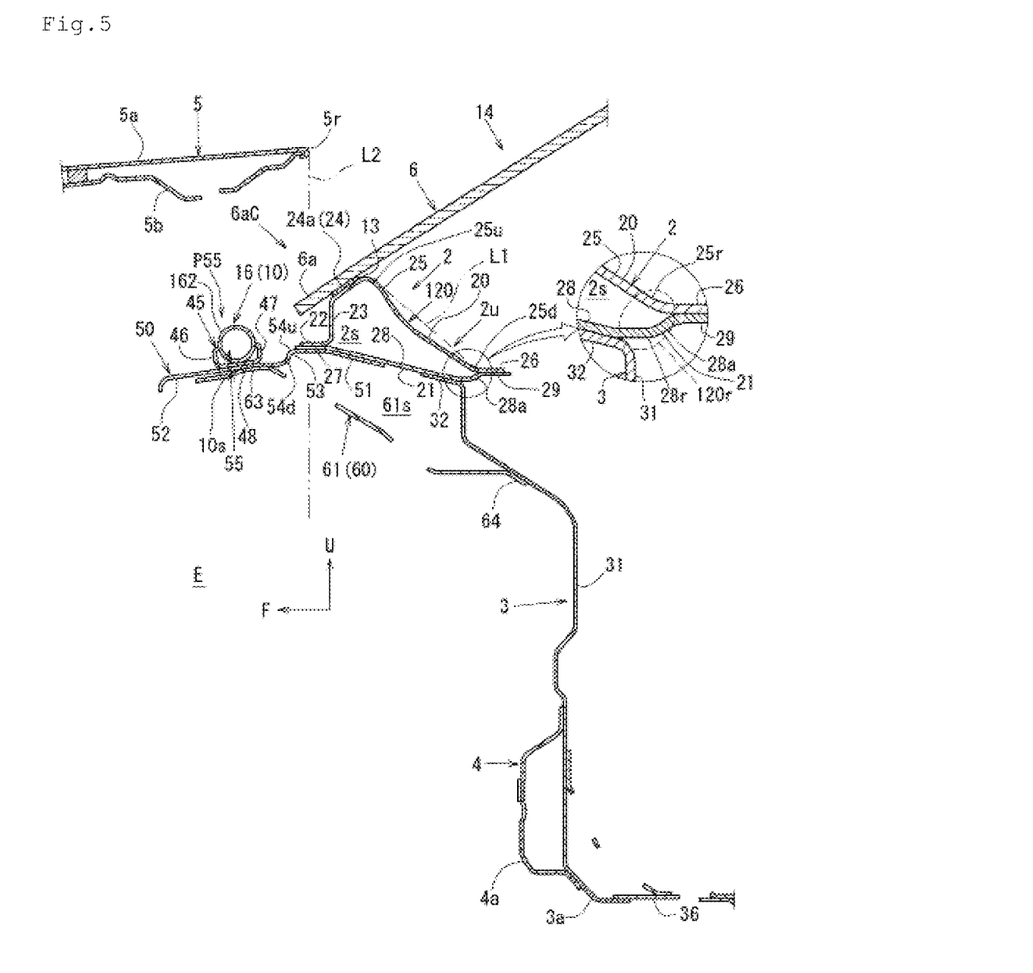
FIG. 5 is an arrow cross-sectional view taken along line B-B in FIG. 3.

As illustrated in FIG. 1 and FIG. 5, the cowl 2 has a length in the vehicle width direction which is slightly longer on both sides than a length of a lower edge 6a of the front windshield 6 (see FIG. 5), the lower edge 6a extending in the vehicle width direction (hereinafter abbreviated as "windshield lower edge 6a"). As illustrated in FIG. 5, the windshield lower edge 6a is bonded to the cowl 2 via a window rubber 13. This bonding surface 24a (bonding region) is formed throughout a generally whole width of the windshield lower edge 6a in the vehicle width direction. Note that the dotted region in a first surface portion 24 of the cowl 2 in FIG. 1, the first surface portion 24 being described later, indicates the bonding surface 24a.

Figure 4:
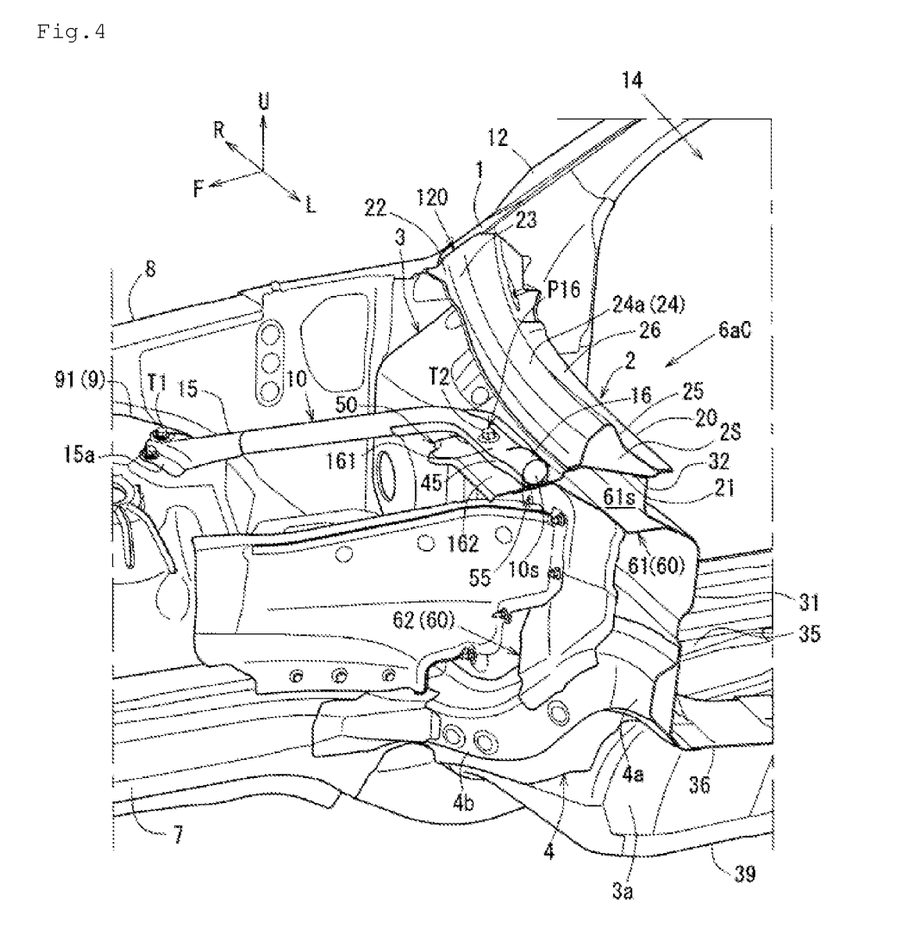
FIG. 4 is a perspective cross-sectional view of a cut end portion along line B-B in FIG. 3 as seen from a left and front area of the vehicle.

Furthermore, as illustrated in FIG. 4 and FIG. 5, the cowl 2 includes the cowl upper panel 20 and a cowl lower panel 21, and a closed cross-section portion 120 is formed in which a closed cross-sectional space 2s extending in the vehicle width direction is formed.

As illustrated in FIG. 1, FIG. 2, FIG. 4, and FIG. 5, the dash panel 3 is disposed in a vertical wall shape so as to extend in the width direction and up-down direction of the vehicle between the left and right hinge pillars 1 and so as to partition an engine room E from a vehicle cabin in a vehicle front-rear direction, and a lower portion of the dash panel 3 extends while being inclined rearward toward a lower area (see FIG. 4 and FIG. 5).

Note that as illustrated in FIG. 1 and FIG. 4, a floor panel 35 forming a bottom surface of the vehicle cabin is joined to a lower portion back end of the dash panel 3. This floor panel 35 extends generally horizontally in the width direction and front-rear direction of the vehicle, and in a vehicle-width-direction center portion, a floor tunnel 36 protruding into the vehicle cabin (upward) and extending in the vehicle front-rear direction is integrally or substantially integrally formed.

As illustrated in FIG. 4 and FIG. 5, the dash panel 3 includes a dash panel body 31 disposed below the cowl 2 and extending in the vehicle up-down direction in a vertical wall shape and an upper end flange portion 32 extending from an upper end of the dash panel body 31 to the vehicle front area, and the upper end flange portion 32 is joined, from a lower area, to a bottom surface portion 28 of the cowl lower panel 21 of the cowl 2.

In addition, as illustrated in FIG. 2 and FIG. 4, a lower end edge of the dash panel 3 in the vicinity of a general center in the vehicle width direction is formed into, in a front view, a shape protruding to the vehicle upper area in a generally inverted U shape along the floor tunnel 36 extending in the vehicle cabin in the vehicle front-rear direction. This lower end edge formed into the shape along the floor tunnel 36 will be denoted as a tunnel corresponding portion 3a.

Further, as illustrated in FIG. 2, FIG. 4, and FIG. 5, the dash cross member 4 couples lower portions of the left and right hinge pillars 1 together in the vehicle width direction along a lower end edge of a front face of the dash panel body 31. Although not illustrated in detail, this dash cross member 4 is formed to have a generally hat-shaped cross-section protruding to the vehicle front area so as to form a closed cross-section with the dash panel 3 in a vertical cross-section along the up-down direction and front-rear direction of the vehicle.

More specifically, as illustrated in FIG. 2 and FIG. 4, in a front view, the dash cross member 4 is integrally formed with a gate-shaped portion 4a in a general gate shape in a front view, the general gate shape protruding to the vehicle upper area along the tunnel corresponding portion 3a of the dash panel 3, and horizontally extended portions 4b respectively extending to vehicle-width-direction outer sides from a lower end of the gate-shaped portion 4a toward the left and right hinge pillars 1.

Note that as illustrated in FIG. 4, back ends of the front side frames 7 respectively corresponding to the left and right horizontally extended portions 4b and being described later are joined to intermediate portions of the horizontally extended portions 4b in the vehicle width direction, the horizontally extended portions 4b being provided on both sides of the dash cross member 4 (however, FIG. 4 illustrates only a joined portion between the front side frame 7 on a vehicle right side and the dash cross member 4).

As illustrated in FIG. 5, the bonnet (also referred to as "bonnet hood") 5 covers an upper portion of the engine room E while being capable of opening and closing and includes a bonnet outer panel 5a forming an outer surface of the bonnet 5 and a bonnet inner panel 5b forming a surface on the engine room E side. The bonnet outer panel 5a is attached to the bonnet inner panel 5b by a hemming process for caulking an outer periphery of the bonnet inner panel 5b by a folded outer periphery.

Both sides, in the vehicle width direction, of a back end of the bonnet 5 are fixed to the vehicle body via bonnet hinges not illustrated, and the bonnet 5 is supported by the vehicle body by those bonnet hinges while being capable of opening and closing about back end portions as pivots.

The front windshield 6 is so-called front window glass, is disposed to cover an opening 14 (see FIG. 1 and FIG. 2) formed in the vehicle body for disposing a front window, and extends to an upper and rear area of the vehicle in a rear area of the bonnet 5 while being inclined as illustrated in FIG. 5. Note that the front windshield 6 is not limited to glass but may be formed of a transparent reinforced plastic.

The front windshield 6 is fixed to an edge portion of the opening 14 for disposing the front window. Specifically, an upper edge of the front windshield 6 is supported by a front header 38 (see FIG. 2) forming an upper edge of the opening 14 for disposing the front window. Note that the front header 38 is a vehicle-body framework member extending in the vehicle width direction along a front edge of a roof portion 37. In addition, left and right side edges of the front windshield 6 are supported by the front pillars 12 forming side edges respectively corresponding to left and right sides of the opening 14 for disposing the front window, and the lower edge 6a of the windshield 6 is supported by the cowl 2 forming a lower side edge of the opening 14 for disposing the front window as described above.

Further, as illustrated in FIG. 1 and FIG. 4, the front side frames 7 extend in the vehicle front-rear direction on both of left and right sides of the engine room E.

Although not illustrated, a configuration is made such that a crash can be mounted on front ends of the front side frames 7 via a setting plate.

As illustrated in FIG. 4, the back ends of the front side frames 7 are joined to the lower portion of the dash panel 3, and its rear portion is joined to floor side frames 39 extending in the vehicle front-rear direction in a lower portion of the floor panel 35.

As illustrated in FIG. 1, FIG. 2, and FIG. 4, the apron-reins 8 extend in the vehicle front-rear direction on the vehicle-width-direction outer sides and in the vehicle upper area of the front side frames 7, and back ends are joined to upper ends of the hinge pillars 1 respectively corresponding to the left and right apron-reins 8.

Further, each of the above-described hinge pillar 1, front side frame 7, and apron-rein 8 is provided as a vehicle-body framework member such that a cross-section orthogonal to an extending direction has a closed cross-section shape.

The sus-tower 9 is provided between respective rear portions of the front side frame 7 and the apron-rein 8. An upper portion of the sus-tower 9 is composed of a front suspension housing 91 as a sus-tower upper panel. The front suspension housing 91 is joined to the front side frame 7 and the apron-rein 8 across their rear portions. In addition, in the front suspension housing 91, a damper mounting portion 91a in a generally circular shape in a planar view is formed on which an upper end of a front suspension damper (not illustrated) is mounted (see FIG. 1 and FIG. 2).

Further, as illustrated in FIG. 1 to FIG. 5, the tower bar 10 extends in the vehicle width direction between the left and right sus-towers 9 so as to couple those together. The tower bar 10 extends in the vehicle width direction such that a center portion in the vehicle width direction makes circumvention to a side of a center portion of the cowl 2 in the vehicle width direction (the vehicle rear area). Further, the center portion of the tower bar 10 in the vehicle width direction is coupled with the center portion of the cowl 2 in the vehicle width direction via a bracket 50 described later.

That is, because as described above, the cowl 2 has a closed cross-section structure having the closed cross-sectional space 2s extending in the vehicle width direction in the internal portion (see FIG. 4 and FIG. 5), the tower bar 10 is not directly joined to the cowl 2 but is joined, as described above, via the bracket 50 in a region around a front area of the vehicle-width-direction center portion (6aC) of the cowl 2 (see FIG. 3 and FIG. 4).

The tower bar 10 includes a pair of left and right bar vehicle-width outer side portions 15 and a bar vehicle-width center portion 16 and is formed into a cylindrical shape (pipe shape) throughout generally the whole tower bar 10 in an extending direction (the whole thereof except flanges 15a on left and right sides and fastening portions 161 which will be described later). Further, the bar vehicle-width center portion 16 is formed with a single member continuously extending in the vehicle width direction (longitudinal direction).

The pair of left and right bar vehicle-width outer side portions 15 generally linearly extend from the front suspension housings 91 of the sus-towers 9 to the vehicle rear area and to a center in the vehicle width direction, the sus-towers 9 respectively corresponding to the left and right bar vehicle-width outer side portions 15.

As illustrated in FIG. 3, the bar vehicle-width center portion 16 generally linearly extends in the vehicle width direction in parallel with the center portion (6aC) in a region around a front area of the center portion (6aC) of the cowl 2 in the vehicle width direction so as to couple back ends of the left and right bar vehicle-width outer side portions 15 together.

As illustrated in FIG. 1, FIG. 2, and FIG. 4, the tower bar 10 is mounted on and fixed to the front suspension housings 91 of the left and right sus-towers 9 by fastening members T1 (bolts and nuts). Specifically, the flanges 15a for mounting the sus-towers 9 are respectively integrally formed at outer ends (front ends), in the vehicle width direction, of the pair of left and right bar vehicle-width outer side portions 15 in the tower bar 10. Further, the flanges 15a on the left and right sides are fastened to rear vicinity positions of the damper mounting portions 91a in the front suspension housing 91 respectively corresponding to the left and right flanges 15a by the fastening members T1.

Figure 6:
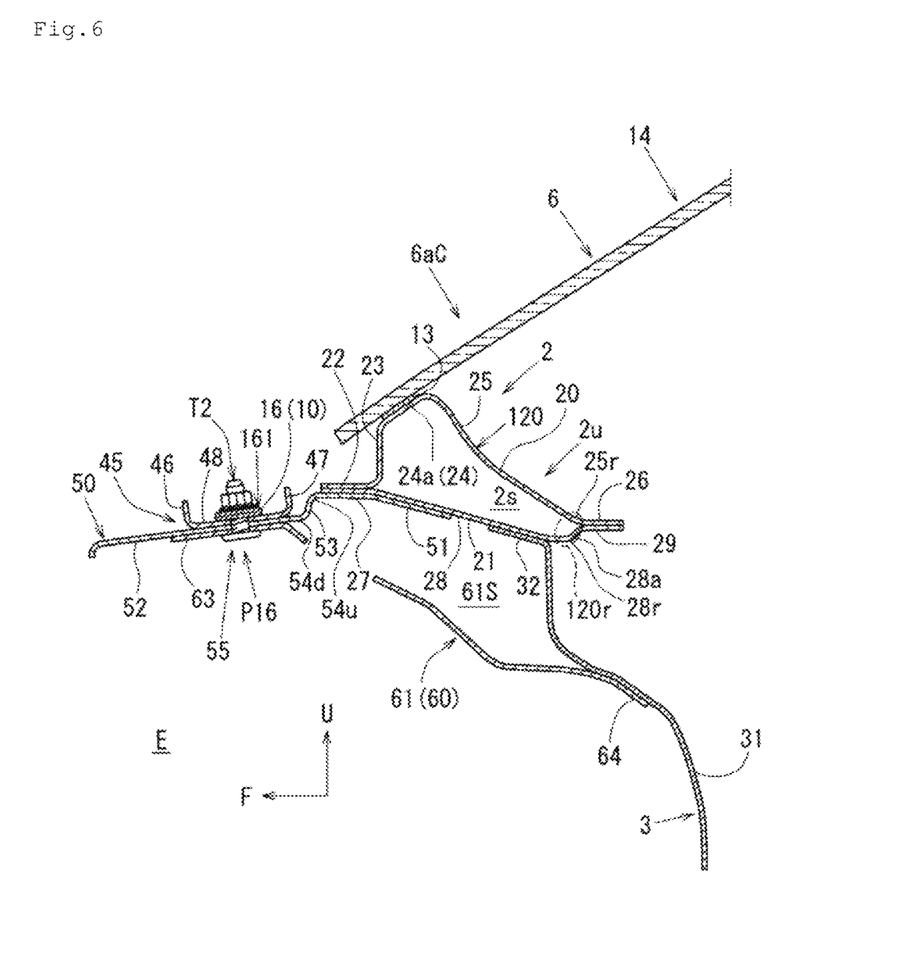
FIG. 6 is an arrow cross-sectional view taken along line C-C in FIG. 3.

Further, as illustrated in FIG. 4 to FIG. 6, the cowl upper panel 20 of the cowl 2 is formed to have an open cross-section shape in which an orthogonal cross-section to the vehicle width direction opens downward. Specifically, the cowl upper panel 20 is integrally formed while having a front-side flange 22 generally horizontally extending in the vehicle front-rear direction, a front face 23 rising from a back end of the front-side flange 22 to the vehicle upper area, a first surface portion 24 further extending generally linearly from an upper end of the front face 23 to the vehicle upper area and to the vehicle rear area while being inclined, a second surface portion 25 extending from a back end of the first surface portion 24 to a rear and lower area of the vehicle while being inclined, and a rear-side flange 26 generally horizontally extending from a back end of the second surface portion 25 to the vehicle rear area.

That is, a top face 2U of the cowl 2 is formed with the first surface portion 24 and the second surface portion 25. As illustrated in FIG. 5, a corner portion of the first surface portion 24 and the second surface portion 25 is formed in a curved shape directed upward in an orthogonal cross-sectional view to the vehicle width direction.

The first surface portion 24 is formed to have the inclination angle corresponding to an inclination angle of the front windshield 6 and is formed while having the above bonding surface 24a bonding the windshield lower edge 6a as described above.

The second surface portion 25 extends to a rear and lower area of the vehicle while being inclined throughout a whole length in the vehicle front-rear direction to the extent that a back end of the second surface portion 25 is positioned below a height of the front-side flange 22 and in the rear of a position of the dash panel body 31 in a vertical wall shape.

An inclination angle of the second surface portion 25 is inclined downward toward the vehicle rear area throughout its whole length in the vehicle front-rear direction and is set to an inclination angle along an angle at which the head of a pedestrian moves from a front and upper area to the cowl 2 in collision.

In short, the cowl 2 is not formed to be easily crushed by having a breakage trigger or the like for collision but, as for a rear portion (the second surface portion 25), is formed to be inclined downward toward a rear area of the vehicle so as to avoid (parry) a colliding object. In addition, a front portion of the cowl 2 is formed to have a layout not hindering downward plastic deformation of the bonnet 5. Thus, the cowl 2 of this embodiment can maintain pedestrian protection performance in addition to securing rigidity of the cowl 2 itself. Note that in this embodiment, the second surface portion 25 is formed such that a front side portion is inclined downward toward a rear area of the vehicle with a steeper slope than a rear side portion (see FIG. 5).

Here, as illustrated in an enlarged portion of principal components in FIG. 5, an extending portion, in the second surface portion 25, extending to the rear of an upper end (a back end of the upper end flange portion 32) of the dash panel body 31 will hereinafter be referred to as "rear extending portion 25r".

Further, as illustrated in FIG. 5, the second surface portion 25 is formed such that an imaginary straight line L1 connecting a lower end 25d with an upper end 25u intersects (is generally orthogonal in this example) with the front windshield 6 inclined in a front-low rear-high shape in an orthogonal cross-sectional view to the vehicle width direction. Accordingly, the second surface portion 25 is configured to effectively receive and inhibit vibration of the front windshield 6.

As illustrated in FIG. 5 and FIG. 6, the cowl lower panel 21 is formed into a generally flat-plate shape so as to close a downward opening of the cowl upper panel 20. Specifically, the cowl lower panel 21 is integrally formed with a front-side flange 27 generally horizontally extending in the vehicle front-rear direction, the bottom surface portion 28 extending from a back end of the front-side flange 27 to a rear and lower area of the vehicle while being inclined, and a rear-side flange 29 generally horizontally extending from a back end of the bottom surface portion 28 to the vehicle rear area.

The bottom surface portion 28 is inclined downward toward the vehicle rear area throughout a whole length in the vehicle front-rear direction similarly to the second surface portion 25 but is inclined with a milder slope than the second surface portion 25, and as illustrated in the enlarged portion of principal components in FIG. 5, the back end is positioned in the rear of the upper end of the dash panel body 31 in a vertical wall shape.

As illustrated in the enlarged portion of principal components in FIG. 5, in an extending portion 28r, in the bottom surface portion 28, extending to the rear of the dash panel body 31 (hereinafter referred to as "rear extending portion 28r"), a rising portion 28a is formed which rises toward the rear-side flange 26 of the cowl upper panel 20.

In the cowl 2, the front-side flanges 22 and 27 and the respective rear-side flanges 26 and 29 in the cowl upper panel 20 and the cowl lower panel 21 are joined together by welding, and the closed cross-section portion 120 is formed as described above. That is, the closed cross-section portion 120 of the cowl 2 is formed with the front face 23, the first surface portion 24, and the second surface portion 25 in the cowl upper panel 20 and the bottom surface portion 28 in the cowl lower panel 21.

In the vehicle rear area of the upper end of the dash panel body 31 in a vertical wall shape in the closed cross-section portion 120 of the cowl 2, a bulge 120r bulging from the dash panel body 31 to the vehicle rear area is formed with the rear extending portion 25r of the second surface portion 25 and the rear extending portion 28r of the bottom surface portion 28. In other words, the bulge 120r is formed in the vehicle rear area of a joined portion between the upper end flange portion 32 of the dash panel 3 and the bottom surface portion 28 of the cowl 2.

As described above, the closed cross-section portion 120 of the cowl 2 is formed to have the bulge 120r in a rear portion and thereby secures an area of an orthogonal cross-section to the vehicle width direction as much as possible compared to a case where the bulge 120r is not provided.

Further, the rear portion of the closed cross-section portion 120 of the cowl 2, the rear portion including the bulge 120r, is formed into a tapered shape so as to gradually bulge to a rear and lower area of the vehicle toward the vehicle rear area.

In addition, as illustrated in the enlarged portion of principal components in FIG. 5, the above-described rising portion 28a formed in a rear portion of the bottom surface portion 28 of the cowl lower panel 21 is positioned in a lower portion of the bulge 120*r*. The rear portion of the closed cross-section portion 120 of the cowl 2 has the tapered shape in the vehicle up-down direction toward the vehicle rear area as described above; however, the above-described rising portion 28*a* is formed, and a length, in the vehicle up-down direction, of the bulge 120*r* positioned around a back end of the closed cross-section portion 120 of the cowl 2 is thereby secured.

Further, as indicated by an imaginary straight line L2 in FIG. 5, a front end of the closed cross-section portion 120 of the cowl 2, that is, the front face 23 is positioned slightly in the rear of the back end of the bonnet 5 so as not to hinder downward plastic deformation of the bonnet 5 when a colliding object to a rear portion of the bonnet 5 (for example, the head of a pedestrian) collides from an upper area. Note that the imaginary straight line L2 is a straight line extending in parallel with the vehicle up-down direction.

Further, in this embodiment, the front face 23 of the closed cross-section portion 120 extends generally in parallel with the vehicle up-down direction. Accordingly, the cowl 2 secures the area of the orthogonal cross-section of the closed cross-section portion 120 to the vehicle width direction as much as possible in the vehicle up-down direction while avoiding interference with the closed cross-section portion 120 in the downward plastic deformation of the bonnet 5.

Note that in this embodiment, the cowl 2 is positioned below a back end 5*r* of the bonnet 5, and the windshield lower edge 6*a* supported by the bonding surface 24*a* of the first surface portion 24 of the cowl 2 is also positioned below the back end 5*r* of the bonnet 5.

Further, as illustrated in FIG. 1 to FIG. 3, in the front vehicle-body structure of this embodiment, node members 40 as rigidity improvement members each of which locally improves bending rigidity of the cowl 2 are disposed in two positions, in the cowl 2, dividing the bonding surface 24*a* to the windshield lower edge 6*a* into generally three equal parts in the vehicle width direction.

In other words, as illustrated in FIG. 1 and FIG. 3, the node members 40 are disposed in two positions corresponding to positions at approximately ⅓ of a length L (see FIG. 1), in an axis direction, of the bonding surface 24*a* to the windshield lower edge 6*a* in the cowl 2. As illustrated in FIG. 2 and FIG. 3, the above-described positions, in which the two node members 40 are disposed, in the vehicle width direction of the cowl 2 are each set to node disposing positions P40.

As illustrated in FIG. 3, the node member 40 is integrally formed, such that an orthogonal cross-section to the vehicle front-rear direction becomes a hat-shaped profile, with a bottom face 41 extending in the vehicle width direction, a pair of left and right side faces 42 extending from both ends of the bottom face 41 in the vehicle width direction to the vehicle upper area, and a pair of left and right upper end flange portions 43 respectively extending in opposite directions in the vehicle width direction from upper ends of the pair of left and right side faces 42.

Further, in the node member 40, the bottom face 41 is joined to the bottom surface portion 28 of the cowl lower panel 21 from an upper area, and the left and right upper end flange portions 43 are joined to the first surface portion 24 and the second surface portion 25 of the cowl upper panel 20 from a lower area.

Accordingly, the node members 40 are locally disposed in the node disposing positions P40 in the vehicle width direction of the cowl 2 and are disposed so as to part (close), in the vehicle width direction, the closed cross-sectional space 2*s* extending in the vehicle width direction of the cowl 2 in the above two node disposing positions P40 in the vehicle width direction of the cowl 2 (see FIG. 3).

Further, as illustrated in FIG. 2 to FIG. 7, in the front vehicle-body structure of this embodiment, the bracket 50 extending from the center portion (6*a*C) to the vehicle front area in a tongue shape is provided in the center portion (6*a*C) of the cowl 2 (windshield lower edge 6*a*) in the vehicle width direction.

Specifically, as illustrated in FIG. 5, the bracket 50 is integrally formed of a steel plate and with a flange portion 51 joined to the cowl 2 and a front extending portion 52 extending from a front end of the flange portion 51 to the vehicle front area. As illustrated in FIG. 3, across a middle position of the cowl 2 in the vehicle width direction, the bracket 50 has a length in the vehicle width direction, the length covering generally the whole center portion 6*a*C of the windshield lower edge 6*a* in the vehicle width direction and also covering both sides with respect to the middle position. Note that in this embodiment, the center portion 6*a*C of the windshield lower edge 6*a* (that is, the bonding surface 24*a*) in the vehicle width direction denotes a region corresponding to a center portion in a case where the bonding surface 24*a* in the cowl 2 to the windshield lower edge 6*a* is divided into generally three equal parts in the vehicle width direction (see FIG. 2 and FIG. 3).

Figure 7:
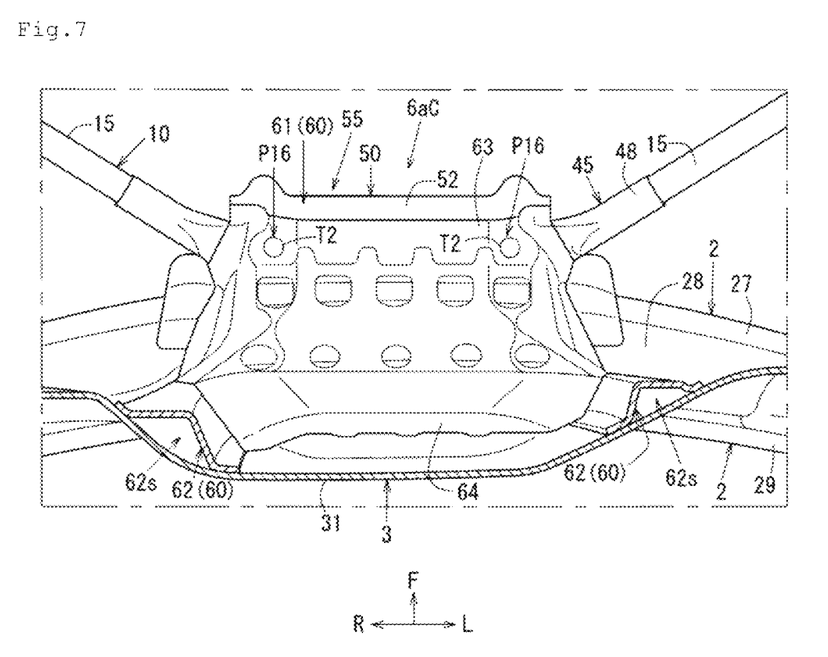
FIG. 7 is an arrow cross-sectional view taken along line D-D in FIG. 2.

Here, as illustrated in FIG. 4 to FIG. 6, the cowl 2 is provided to jut out to a front area with respect to the dash panel body 31. Thus, as illustrated in FIG. 5 to FIG. 7, in the bracket 50, the flange portion 51 is joined to a front side portion of the bottom surface portion 28 and the front-side flange 27 in the cowl 2 from a lower area by welding, in the center portion (6*a*C) of the cowl 2 in the vehicle width direction. Accordingly, the bracket 50 is mounted on the cowl 2 in a cantilever shape protruding forward such that the front extending portion 52 extends forward from the center portion (6*a*C) of the cowl 2 in the vehicle width direction.

As illustrated in FIG. 1 to FIG. 3, the tower bar 10 extends across the front extending portion 52 of the bracket 50 in the vehicle width direction such that the bar vehicle-width center portion 16 is positioned above the bracket 50. Further, as illustrated in FIG. 4 to FIG. 6, mounting of the bar vehicle-width center portion 16 of the tower bar 16 is supported by the front extending portion 52 of the bracket 50 from a lower area via a guide reinforcement member 45.

The guide reinforcement member 45 is formed along the extending direction of the tower bar 10 throughout the bar vehicle-width center portion 16 of the tower bar 10 and rear portions (vehicle-width-direction inner side portions) of the left and right bar vehicle-width outer side portions 15 (see FIG. 1 to FIG. 4 and FIG. 7).

The guide reinforcement member 45 is formed into a U shape opening upward such that the tower bar 10 having a cylindrical orthogonal cross-section to the extending direction is capable of being fitted therein. Specifically, as illustrated in FIG. 5 and FIG. 6, the guide reinforcement member 45 is integrally formed with a front face 46 guiding a fitted portion of the tower bar 10 into the guide reinforcement member 45 from a front side, a rear face 47 guiding the fitted portion from a rear side, and a bottom face 48 coupling lower ends of those front face 46 and rear face 47 together.

As illustrated in FIG. 3, FIG. 4, and FIG. 6, the bar vehicle-width center portion 16 of the tower bar 10 is fastened and fixed to the bracket 50 via the guide reinforcement member 45 in positions on both sides of the bracket 50 in the vehicle width direction, that is, in two positions separated in the vehicle width direction by fastening members T2 (bolts and nuts).

Positions, to which the bar vehicle-width center portion 16 is fastened, in the vehicle width direction of the bracket 50 are set to bar fastening positions P16.

As illustrated in FIG. 3, the left and right bar fastening positions P16 are positioned on vehicle-width-direction inner sides of the node disposing positions P40 respectively corresponding to the left and right bar fastening positions P16. That is, the bar vehicle-width center portion 16 of the tower bar 10 is fixed via the bracket 50 between the respective positions of the two node members 40 in the vehicle width direction of the cowl 2.

As illustrated in FIG. 3, FIG. 4, and FIG. 6, the fastening portions 161 to the bracket 50 in the extending direction of the bar vehicle-width center portion 16 are formed into flat shapes by performing compressive deformation in the vehicle up-down direction such that the cylindrical tower bar 10 locally has flat shapes (that is, collapsing a closed cross-sectional space 10s in an internal portion) and thereby enable fastening by the fastening members T2.

The bar vehicle-width center portion 16 of the tower bar 10 is disposed to extend in the vehicle width direction along the cowl 2 in a region around a front side of the vehicle-width-direction center portion (6aC) of the cowl 2. Note that in this embodiment, the bar vehicle-width center portion 16 has generally the same length in the vehicle width direction as the above-described center portion (6aC) of the cowl 2 in the vehicle width direction.

Further, as illustrated in FIG. 1 to FIG. 5, the other sections of the tower bar 10 in the extending direction than the fastening portions 161 are formed into cylindrical shapes as non-collapsed portions without being compressively deformed in the vehicle up-down direction. In particular, as illustrated in FIG. 3 to FIG. 5, in the bar vehicle-width center portion 16 extending in the vehicle width direction, a portion 162 between the two fastening portions 161 also maintains a tubular shape while the closed cross-sectional space 10s provided in the internal portion is not crushed.

Accordingly, the non-collapsed portions in the extending direction of the tower bar 10 other than the flatly formed fastening portions 161, the non-collapsed portions including the portion 162 between the two fastening portions 161 of the bar vehicle-width center portion 16, maintain higher bending rigidity than the two collapsed fastening portions 161.

Further, as described above, the guide reinforcement member 45 is disposed so as to continuously extend along the extending direction throughout the fastening portions 161 and the non-collapsed portions (including the non-collapsed portion provided in the portion 162 between the two fastening portions 161) in the extending direction of the tower bar 10 and so as to guide the tower bar 10.

As described above, the fastening portions 161 and the non-collapsed portions in the extending direction of the tower bar 10 are connected together in the extending direction by the guide reinforcement members 45, and strength of the fastening portions 161 formed into flat shapes is thereby secured by using strength of the non-collapsed portions.

Further, as illustrated in FIG. 5 and FIG. 6, on a rear portion side (base portion side) of the front extending portion 52 of the bracket 50, a step portion 53 in a stepped shape in the vehicle up-down direction is formed along the vehicle width direction such that a front side section (tip end side) of the front extending portion 52 is positioned below the flange portion 51.

The step portion 53 is formed throughout a whole length of the bracket 50 in the vehicle width direction. In the bracket 50, ridges 54u and 54d extending in the vehicle width direction are respectively formed at upper and lower ends of the step portion 53 by formation of this step portion 53 (the upper end ridge 54u at the upper end of the step portion 53 and the lower end ridge 54d at the lower end of the step portion 53).

Here, to a front side of the step portion 53 in the front extending portion 52 of the bracket 50, as described above, the bar vehicle-width center portion 16 is fixed from an upper area. Further, as illustrated in FIG. 2 and FIG. 4 to FIG. 7, the front vehicle-body structure for a vehicle of this embodiment is provided with a gate-shaped reinforcement member 60 as a reinforcement member reinforcing, from a lower area, a region 55 (hereinafter referred to as "bar fixing region 55"), to which the tower bar 10 is fixed from an upper area, in the front extending portion 52 of the bracket 50.

As illustrated in FIG. 2 and FIG. 4 to FIG. 7, the gate-shaped reinforcement member 60 is formed into a gate shape opening downward in a vehicle front view with a vehicle-width-direction extending member 61 horizontally extending in the vehicle width direction and a pair of left and right vehicle up-down direction extending members 62 generally vertically extending downward from left and right ends of the vehicle-width-direction extending portion.

As illustrated in FIG. 4 to FIG. 7, the vehicle-width-direction extending member 61 is disposed below the cowl lower panel 21 across, in the vehicle front-rear direction, the cowl 2 provided to jut out to the vehicle front area of the dash panel body 31 above the dash panel 3.

Further, as illustrated in FIG. 5 to FIG. 7, a front-side flange 63 formed at a front end of the vehicle-width-direction extending member 61 is joined, from a lower area, to the bar fixing region 55 (that is, a front side portion) of the front extending portion 52 of the bracket 50 positioned in front of the cowl lower panel 21.

Meanwhile, a rear-side flange 64 formed at a back end of the vehicle-width-direction extending member 61 is joined, from a front area, to an upper portion of the dash panel body 31 in a vertical wall shape, the upper portion being positioned below the cowl lower panel 21.

Accordingly, as illustrated in FIG. 4 to FIG. 6, the vehicle-width-direction extending member 61 forms a closed cross-sectional space 61s extending in the vehicle width direction among the bracket 50, the cowl lower panel 21, and the dash panel 3.

Here, as illustrated in FIG. 5 and FIG. 6, as described above, the front-side flange 63 of the vehicle-width-direction extending member 61 is joined, from a lower area, to the bar fixing region 55 of the front extending portion 52 of the bracket 50. This joining position (the position of the front-side flange 63 in FIG. 5) and the position of the step portion 53 (that is, the upper end ridge 54u and the lower end ridge 54d) provided on a base end side of the bracket 50 are formed to be offset (differently positioned) in the vehicle front-rear direction.

That is, the vehicle-width-direction extending member 61 is disposed below the step portion 53 so as to be across, in the vehicle front-rear direction, the step portion 53 (that is, the upper end ridge 54u and the lower end ridge 54d) provided on the base end side of the bracket 50 and so as to have the above-described closed cross-sectional space 61s extending in the vehicle width direction immediately below the step portion 53.

In addition, as illustrated in FIG. 6 and FIG. 7, in the above-described two bar fastening positions P16, the fastening portions 161 of the bar vehicle-width center portion 16 of the tower bar 10, the bottom surface portion 28 of the guide reinforcement member 45, the bar fixing region 55 of the front extending portion of the bracket 50, and in addition, the front-side flange 63 of the vehicle-width-direction extending member 61 are fastened and fixed by the above-described bolts and nuts.

Further, as illustrated in FIG. 2 and FIG. 4, the left and right vehicle up-down direction extending members 62 extend in the vehicle up-down direction so as to couple both ends of the vehicle-width-direction extending member 61 which respectively correspond to the left and right vehicle up-down direction extending members 62 with both ends of the gate-shaped portion 4a in the dash cross member 4 which respectively correspond to the left and right vehicle up-down direction extending members 62.

As illustrated in FIG. 2, the left and right vehicle up-down direction extending members 62 are provided in parts which in the vehicle width direction, agree with the node disposing positions P40 respectively corresponding to the left and right vehicle up-down direction extending members 62. In this embodiment, both of the left and right vehicle up-down direction extending members 62 extend generally in parallel with the vehicle up-down direction in a vehicle front view.

The left and right vehicle up-down direction extending members 62 extend downward from a rear portion of the vehicle-width-direction extending member 61 extending in the vehicle front-rear direction below the cowl 2 and form a closed cross-sectional spaces 62s extending in the vehicle up-down direction between the vehicle up-down direction extending members 62 and a front surface of the dash panel body 31 as illustrated in FIG. 7.

That is, the closed cross-sectional space 61s (see FIG. 5 and FIG. 6) of the vehicle-width-direction extending member 61, the respective closed cross-sectional spaces 62s (see FIG. 7) of the pair of left and right vehicle up-down direction extending members 62, and their joined portions together continuously extend.

As illustrated in FIG. 1 to FIG. 5, the above-described front vehicle-body structure for a vehicle of this embodiment is a front vehicle-body structure having: the front windshield 6 (see FIG. 5) fixed to the edge portion of the opening 14 formed in the vehicle body; the pair of left and right front suspension housings 91; the cowl 2 forming a lower edge of the opening 14 for the front windshield 6; and the tower bar 10 coupling each of the left and right front suspension housings 91 with a region around the vehicle-width-direction center portion of the cowl 2. As illustrated in FIG. 1 to FIG. 4, the pair of left and right tower bars 10 have the bar vehicle-width center portion 16 (center portion) extending in the vehicle width direction along the cowl 2. As illustrated in FIG. 1 to FIG. 7, the bracket 50 extending from the cowl 2 toward a front of the vehicle is provided in a region including the center portion 6aC of the windshield lower edge 6a (the front windshield 6 in the lower edge of the opening 14) in the vehicle width direction. As illustrated in FIG. 2 and FIG. 4 to FIG. 7, to the bracket 50, the bar vehicle-width center portion 16 of the tower bar 10 is fixed from above, and the vehicle-width-direction extending member 61 (reinforcement member) supporting the bar fixing region 55 (fixing region) from below is provided.

The above configuration can certainly reduce second-order vibration occurring to the front windshield 6 due to vibration transmitted from a road surface to the front windshield 6 in vehicle traveling and further can improve NVH performance in the vehicle cabin by inhibiting uncomfortable sound (muffled sound) sensed by an occupant from being transmitted into the vehicle cabin.

Work and effects of a vehicle-body front structure of this embodiment will be described in detail by using FIG. 8 and FIG. 9. Both of FIG. 8 and FIG. 9 illustrate a second-order vibration mode occurring to the front windshield 6 due to vibration (110 to 120 Hz) transmitted from a road surface to the front windshield 6 via the suspension towers 9, the front side frames 7, and so forth in vehicle traveling.

Figure 8:
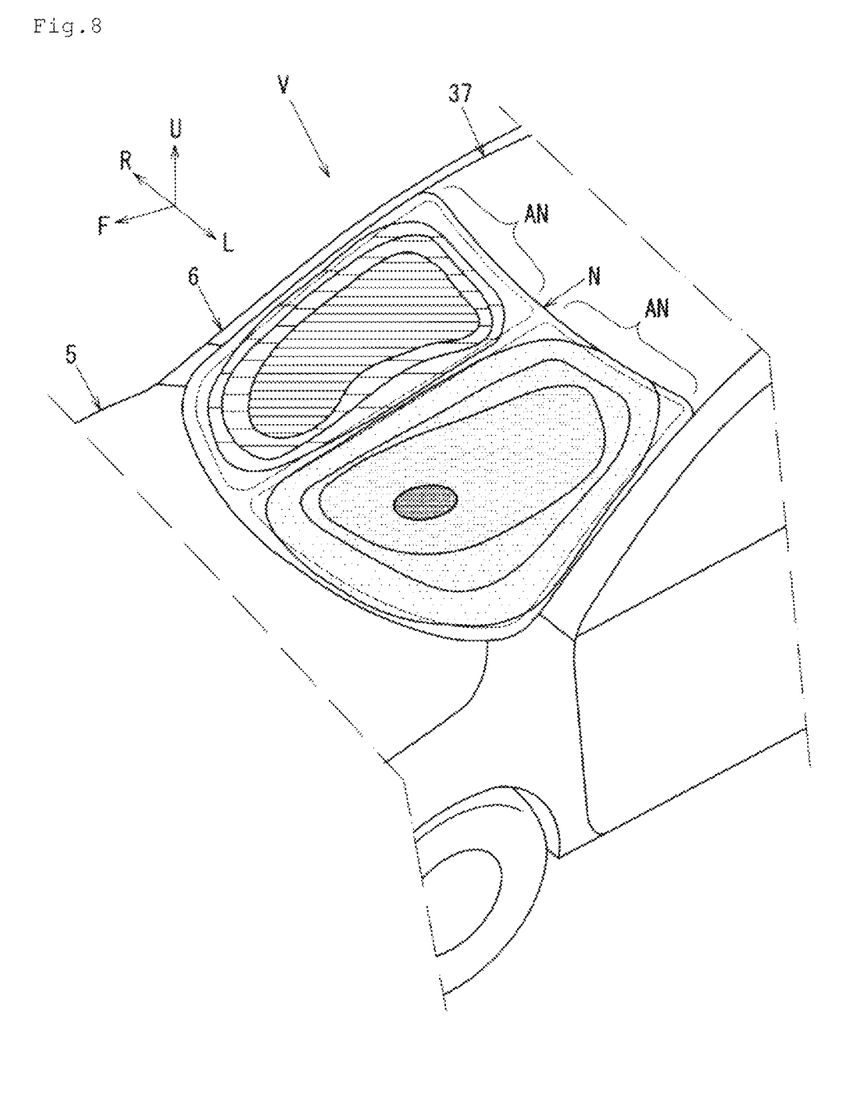
FIG. 8 is an explanatory diagram explaining a second-order vibration mode of a front windshield of this embodiment.
Figure 9:
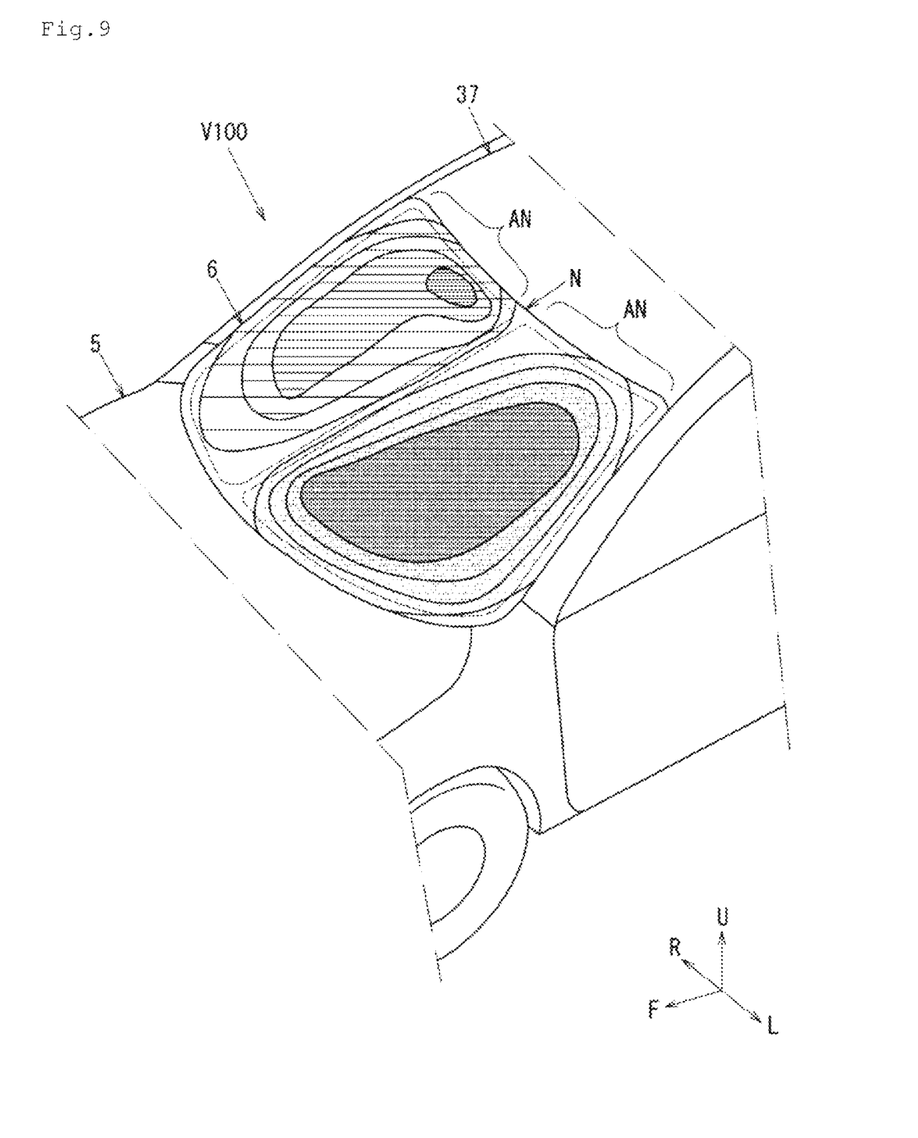
FIG. 9 is an explanatory diagram explaining a second-order vibration mode of a front windshield of a related art example.

Specifically, FIG. 8 is an explanatory diagram explaining a second-order vibration mode of the front windshield 6 in a vehicle-body front structure (V) of this embodiment, and FIG. 9 is an explanatory diagram explaining a second-order vibration mode of the front windshield 6 in a vehicle-body front structure (V100) in related art. Note that for convenience of illustration, FIG. 8 and FIG. 9 illustrate differences in a vibration level of the front windshield 6 by the magnitudes (denseness) of densities of hatching and dots. Further, in FIG. 8 and FIG. 9, hatched regions (regions on the right sides in FIGS. 8 and 9) and dotted regions (regions on the left sides in FIGS. 8 and 9) in the front windshields 6 indicate the regions corresponding to antinodes of the second-order vibration modes in different phases.

The vehicle-body front structure of this embodiment is not a structure as in the vehicle-body front structure in related art, in which a middle portion of a tower bar in the vehicle width direction is simply mounted on a middle position of a cowl in the vehicle width direction, but is a structure, as described above, in which in the region including the center portion 6aC of the windshield lower edge 6a in the vehicle width direction, the tower bar 10 is disposed in the vehicle width direction along the cowl 2, and the bar vehicle-width center portion 16 is fixed to the cowl 2 via the bracket 50.

That is, in the vehicle-body front structure of this embodiment, the tower bar 10 is fixed to the cowl 2 via the bracket 50, so as to be across the section corresponding to a node N (see FIG. 8) of second-order vibration in the vehicle width direction, throughout the sections corresponding to antinodes AN (see FIG. 8) present on both of those sides.

In addition, the vehicle-body front structure of this embodiment, as described above, the vehicle-width-direction extending member 61 supporting the bar fixing region 55 from below is provided to the bar fixing region 55 in the bracket 50.

Consequently, the vehicle-body front structure of this embodiment can enhance rigidity of the cowl 2 supporting the front windshield 6 against vibration transmitted from a road surface to a side of the front windshield 6 in vehicle traveling and can reduce the amplitudes of the antinodes of the second-order vibration mode compared to the vehicle-body front structure in related art as it is clear from the differences in the magnitude of densities of hatching and dots illustrated in FIG. 8 and FIG. 9.

That is, in FIG. 8 illustrating the second-order vibration mode of this embodiment, regions in which the densities become high (dense) can be reduced in both of the hatched region and dotted region compared to FIG. 9 illustrating the second-order vibration mode of a related art example.

As an aspect of this disclosure, as illustrated in FIG. 3, FIG. 4, FIG. 6, and FIG. 7, in the tower bar 10, the bar vehicle-width center portion 16 is fastened to the vehicle-width-direction extending member 61 in two parts separated in the vehicle width direction. As illustrated in FIG. 1 to FIG. 5, the portion 162 between the fastening portions 161 (mounting portions) in the two parts in the tower bar 10 is formed to maintain the tubular shape so as to have higher bending rigidity than those fastening portions 161, without crushing the closed cross-sectional space 10s (see FIG. 5) provided in the internal portion.

In the above configuration, deformation of the tower bar 10, the deformation occurring between the left and right flanges 15a (left and right tower bar mounting portions) for mounting the tower bar 10 on the vehicle body and vibrating the tower bar 10 in opposite phases, is further inhibited, and second-order vibration of the front windshield 6 can be reduced.

As an aspect of this disclosure, as illustrated in FIG. 5 and FIG. 6, in a region of the bracket 50 in front of the cowl 2, that is, the base portion of the front extending portion 52 (in this example, a region in front of the cowl 2 and in the rear of the tower bar 10), the upper end ridge 54u and lower end ridge 54d (ridges) extending in the vehicle width direction are formed.

In the above configuration, because bending rigidity of the bracket 50 in a direction orthogonal to the vehicle width direction is enhanced by the upper end ridge 54u and the lower end ridge 54d, vibration having a node in a vehicle-width-direction center portion and having opposite phases on left and right sides can be made further less likely to occur, and second-order vibration of the front windshield 6 can be reduced.

As an aspect of this disclosure, as illustrated in FIG. 5 and FIG. 6, a mounting position of the vehicle-width-direction extending member 61 on the bracket 50 (the position of the front-side flange 63 in FIG. 5 and FIG. 6) and positions of the ridges 54u and 54d are formed to be offset in the vehicle front-rear direction.

The bracket 50 of this embodiment has a structure in which it supports the bar vehicle-width center portion 16 while extending from the cowl 2 toward a front of the vehicle in a cantilever shape. However, as described above, in the bracket 50, the mounting position of the vehicle-width-direction extending member 61 and the positions of the upper end ridge Mu and the lower end ridge 54d are formed to be offset in the vehicle front-rear direction as described above, and rigidity can thereby be enhanced throughout a wide range of the bracket 50 in the vehicle front-rear direction.

Consequently, the vibration having the node in the vehicle-width-direction center portion and having opposite phases on the left and right sides can be made further less likely to occur to the front windshield 6 supported by the cowl 2.

As an aspect of this disclosure, the mounting position of the front-side flange 63 of the vehicle-width-direction extending member 61 on the bracket 50 agrees with the bar fixing region 55 of the bracket 50 in a vehicle planar view (see FIG. 5 to FIG. 7).

In the above configuration, because the vehicle-width-direction extending member 61 can be mounted on the position corresponding to the bar fixing region 55 of the bracket 50, the bar fixing region 55 can further be reinforced.

As an aspect of this disclosure, as illustrated in FIG. 2, FIG. 4, and FIG. 7, below the vehicle-width-direction extending member 61, the vehicle up-down direction extending members 62 (closed cross-sectional members) are provided which have the closed cross-sectional spaces 62s (closed cross-sections) (see FIG. 7) extending in a vehicle down direction from the vehicle-width-direction extending member 61 in internal portions.

That is, in the front vehicle-body structure of this embodiment, the gate-shaped reinforcement member 60 is composed of the above-described vehicle-width-direction extending member 61 supporting the bar fixing region 55 (fixed territory) in the bracket 50 from below and the pair of left and right vehicle up-down direction extending members 62 extending downward from the both ends of the vehicle-width-direction extending member 61 in the vehicle width direction.

In the above configuration, because the vehicle-width-direction extending member 61 itself is reinforced by the vehicle up-down direction extending members 62, the bar fixing region 55 in the bracket 50 can further be reinforced.

This disclosure is not limited only to the configuration of the above-described embodiment but may be formed as various embodiments.

What is claimed is:

1. A front vehicle-body structure for a vehicle, comprising:
    a front windshield fixed to an edge portion of an opening in a vehicle body;
    a pair of left and right front suspension housings;
    a cowl defining a lower edge of the opening for the front windshield;
    a tower bar having a center portion extending in a vehicle width direction along the cowl and coupling each of the left and right front suspension housings with a region around a vehicle-width-direction center portion of the cowl;
    a bracket, extending from the cowl toward a front of the vehicle, and provided in a region including a vehicle-width-direction center portion of the front windshield in the lower edge of the opening, the center portion of the tower bar being fixed to the bracket from above at a fixing region; and
    a reinforcement member supporting the fixing region from below, wherein
    the tower bar is mounted on the reinforcement member in two parts separated in the vehicle width direction in the center portion, and
    a portion of the tower bar between mounting portions in the two parts is configured so as to have higher bending rigidity than the mounting portions.

2. The front vehicle-body structure for a vehicle according to claim 1, wherein
    a ridge extending along the vehicle width direction is formed in a region of the bracket in front of the cowl.

3. The front vehicle-body structure for a vehicle according to claim 2, wherein
    a mounting position of the reinforcement member on the bracket and a position of the ridge are offset in a vehicle front-rear direction.

4. The front vehicle-body structure for a vehicle according to claim 3, wherein
    the mounting position of the reinforcement member on the bracket agrees with the fixing region of the bracket in a vehicle planar view.

5. The front vehicle-body structure for a vehicle according to claim 4, further comprising:
    a closed cross-sectional member extending in a vehicle down direction from the reinforcement member below the reinforcement member.

6. A front vehicle-body structure for a vehicle, comprising:
    a front windshield fixed to an edge portion of an opening in a vehicle body;
    a pair of left and right front suspension housings;
    a cowl defining a lower edge of the opening for the front windshield;

a tower bar having a center portion extending in a vehicle width direction along the cowl and coupling each of the left and right front suspension housings with a region around a vehicle-width-direction center portion of the cowl;

a bracket, extending from the cowl toward a front of the vehicle, and provided in a region including a vehicle-width-direction center portion of the front windshield in the lower edge of the opening, the center portion of the tower bar being fixed to the bracket from above at a fixing region; and a reinforcement member supporting the fixing region from below, wherein a ridge extending along the vehicle width direction is formed in a region of the bracket in front of the cowl.

7. A front vehicle-body structure for a vehicle, comprising:

a front windshield fixed to an edge portion of an opening in a vehicle body;

a pair of left and right front suspension housings;

a cowl defining a lower edge of the opening for the front windshield;

a tower bar having a center portion extending in a vehicle width direction along the cowl and coupling each of the left and right front suspension housings with a region around a vehicle-width-direction center portion of the cowl;

a bracket, extending from the cowl toward a front of the vehicle, and provided in a region including a vehicle-width-direction center portion of the front windshield in the lower edge of the opening, the center portion of the tower bar being fixed to the bracket from above at a fixing region;

a reinforcement member supporting the fixing region from below; and a closed cross-sectional member extending in a vehicle down direction from the reinforcement member below the reinforcement member.

8. The front vehicle-body structure for a vehicle according to claim 1, further comprising:

a closed cross-sectional member extending in a vehicle down direction from the reinforcement member below the reinforcement member.

9. The front vehicle-body structure for a vehicle according to claim 2, further comprising:

a closed cross-sectional member extending in a vehicle down direction from the reinforcement member below the reinforcement member.

10. The front vehicle-body structure for a vehicle according to claim 3, further comprising:

a closed cross-sectional member extending in a vehicle down direction from the reinforcement member below the reinforcement member.

11. The front vehicle-body structure for a vehicle according to claim 6, wherein a mounting position of the reinforcement member on the bracket and a position of the ridge are offset in a vehicle front-rear direction.

12. The front vehicle-body structure for a vehicle according to claim 6, further comprising:

a closed cross-sectional member extending in a vehicle down direction from the reinforcement member below the reinforcement member.

13. The front vehicle-body structure for a vehicle according to claim 11, wherein the mounting position of the reinforcement member on the bracket agrees with the fixing region of the bracket in a vehicle planar view.

14. The front vehicle-body structure for a vehicle according to claim 11, further comprising:

a closed cross-sectional member extending in a vehicle down direction from the reinforcement member below the reinforcement member.

15. The front vehicle-body structure for a vehicle according to claim 13, further comprising:

a closed cross-sectional member extending in a vehicle down direction from the reinforcement member below the reinforcement member.

16. The front vehicle-body structure for a vehicle according to claim 1, wherein the reinforcement member is a vehicle-width-direction extending member horizontally extending in the vehicle width direction, wherein the vehicle-width-direction extending member is disposed below a cowl lower panel of the cowl, and across the cowl in a vehicle front-rear direction to jut out to a vehicle front area of a dash panel body above dash panel, and a front-side flange formed at a front end of the vehicle-width-direction extending member is joined, from a lower area, to the fixing region of a front extending portion of the bracket positioned in front of the cowl lower panel.

17. The front vehicle-body structure for a vehicle according to claim 16, wherein the vehicle-width-direction extending member configures a closed cross-sectional space extending in the vehicle width direction among the bracket, the cowl lower panel, and the dash panel, and the vehicle-width-direction extending member is disposed below a step portion provided on a base end side of the bracket, so as to be across, in the vehicle front-rear direction, the step portion and so that the closed cross-sectional space extends in the vehicle width direction immediately below the step portion.

18. The front vehicle-body structure for a vehicle according to claim 6, wherein the reinforcement member is a vehicle-width-direction extending member horizontally extending in the vehicle width direction, wherein the vehicle-width-direction extending member is disposed below a cowl lower panel of the cowl, and across the cowl in a vehicle front-rear direction to jut out to a vehicle front area of a dash panel body above dash panel, and a front-side flange formed at a front end of the vehicle-width-direction extending member is joined, from a lower area, to the fixing region of a front extending portion of the bracket positioned in front of the cowl lower panel.

19. The front vehicle-body structure for a vehicle according to claim 7, wherein the reinforcement member is a vehicle-width-direction extending member horizontally extending in the vehicle width direction, wherein the vehicle-width-direction extending member is disposed below a cowl lower panel of the cowl, and across the cowl in a vehicle front-rear direction to jut out to a vehicle front area of a dash panel body above dash panel, and a front-side flange formed at a front end of the vehicle-width-direction extending member is joined, from a lower area, to the fixing region of a front extending portion of the bracket positioned in front of the cowl lower panel.

* * * * *